(12) United States Patent  (10) Patent No.: US 7,622,915 B2
Sugiyama et al.  (45) Date of Patent: Nov. 24, 2009

(54) MAGNETIC HEAD TEST METHOD AND MAGNETIC HEAD TESTER

(75) Inventors: Toshinori Sugiyama, Ashigarakami-gun (JP); Hideki Mochizuki, Ashigarakami-gun (JP); Shinji Honma, Ashigarakami-gun (JP); Yoshinori Tokumura, Ashigarakami-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/146,748

(22) Filed: Jun. 26, 2008

(65) Prior Publication Data

US 2009/0002861 A1    Jan. 1, 2009

(30) Foreign Application Priority Data

Jun. 29, 2007    (JP) .............................. 2007-172300

(51) Int. Cl.
*G01R 33/12* (2006.01)
*G01R 33/00* (2006.01)

(52) U.S. Cl. ....................... 324/210; 324/262

(58) Field of Classification Search ......... 324/210–213, 324/262; 360/31; 369/53.1, 69; 29/407.01, 29/737, 739; 702/108, 113, 115–116; 73/865.9

See application file for complete search history.

(56) References Cited

U.S. PATENT DOCUMENTS

| 5,339,702 A | * | 8/1994 | Viches ........................ 73/865.9 |
| 6,229,664 B1 | * | 5/2001 | Albrecht et al. ................ 360/75 |
| 6,930,850 B2 | * | 8/2005 | Takagi et al. ............. 360/77.03 |
| 7,131,346 B1 | * | 11/2006 | Buttar et al. ................ 73/865.9 |

FOREIGN PATENT DOCUMENTS

| JP | 2001-52319 | 2/2001 |
| JP | 2006-179107 | 7/2006 |

\* cited by examiner

*Primary Examiner*—Bot L LeDynh
(74) *Attorney, Agent, or Firm*—Mattingly & Malur, P.C.

(57) ABSTRACT

A magnetic head assembly having a mounting base in which a mounting hole having a protruded peripheral edge is formed is easily mounted on a head clamp table positioning the magnetic head assembly by fitting the mounting hole on a boss pin or a receiving hole of a tray, with a pin or a hole on a mounting table and with a positioning pin on a head clamp table and positioning a suction collet with using a boss pin or a receiving hole of a tray as references, and sucking the mounting base of the magnetic head assembly by a handling robot without requiring high positioning accuracy.

21 Claims, 6 Drawing Sheets

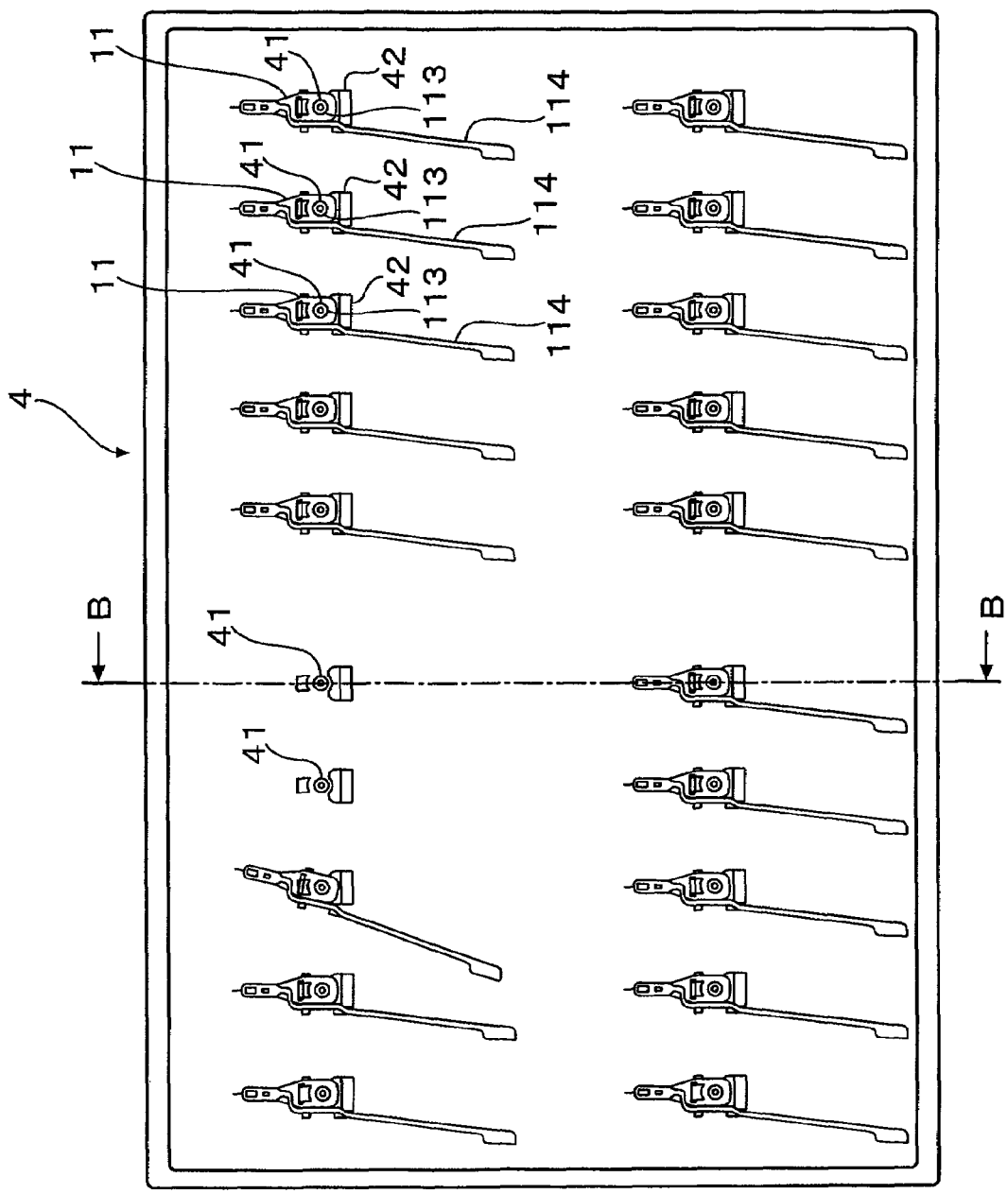

MAGNETIC HEAD TEST METHOD AND MAGNETIC HEAD TESTER

TECHNICAL FIELD

This invention relates to a magnetic head test method and a magnetic head tester and, in particular, this invention relates to a magnetic head test method and a magnetic head tester, in which a magnetic head assembly (including a magnetic head and a suspension spring) is set on a head clamp table of a magnetic head tester, the magnetic head of the magnetic head assembly is tested, the magnetic head assembly is unloaded from the head clamp table after tested and a new head assembly to be tested is set on the head clamp table, so that an exchange work of magnetic head assembly can be automated and through-put of a magnetic head testing processing or the tester can be improved.

BACKGROUND ART

The recording density of a magnetic disk has been increased recently and the recording density of the current hard disk drive (HDD) is in the order of several hundreds giga-bits. With such increased recording density of the magnetic disk, a floating distance of a magnetic head from a magnetic disk is reduced.

A recent magnetic head assembly includes a suspension spring in the order of 15 mm×20 mm and a slider of several to 1 mm square provided in a top portion of the suspension spring, in which a gap between a thin film magnetic head and a magnetic disk is reduced to in the order of several to 10 nm.

The performance test of a magnetic disk as an information recording medium of HDD and a magnetic head (magnetic head assembly) for reading and writing data with respect to the magnetic disk are precisely performed by a tester in the manufacturing step.

HDD of 3.5 inches to 1.8 inches and smaller than 1.0 inch are used in automobile parts, home electric products and audio products. Therefore, reduction of cost and mass production of HDD are requested. Under such requests, a magnetic head tester which can efficiently test a large amount of magnetic disks and miniaturization of the magnetic disk tester are requested.

In order to improve the test efficiency of the magnetic disk or the magnetic head, JP-A-2001-52319 and JP-A-2006-179107 describe a tester having a plurality of test decks and processing signals from the magnetic heads by distributing signals from the test decks between the test decks or selectively switching the test decks.

The test deck of the conventional magnetic head tester includes 1 or 2 spindles for one carriage and it is usual that one measuring portion is assigned to each spindle. And, a new magnetic head assembly is tested after a test of a magnetic head assembly is ended. This switching is performed by hand work.

The test is interrupted during the switching of magnetic head and the measuring portion which receives a read signal from the magnetic head becomes standby state. Therefore, the test efficiency of the magnetic head assembly is dropped. On the other hand, the size of magnetic head assembly is reduced and a mounting and demounting of a magnetic head assembly with respect to a head clamp table of a head carriage which are necessary for the magnetic head test and are performed by using a mounting hole having a protruded edge portion. Therefore, through-put of the head test depends on the switching work of the magnetic head assembly.

In order to improve the efficiency of the magnetic head test, JP-A-2001-52319 describes a technique in which a pair of magnetic head assemblies are arranged on both sides of a magnetic disk opposing each other and tested alternately. In such case, it is necessary to exchange one of the magnetic heads during a test of the other magnetic head. The size and configuration of the current magnetic head assembly is very small as mentioned previously and, when a magnetic head floats from a magnetic disk by a small gap of several to 10 nm, even when one of the magnetic heads is exchanged by the other magnetic head by moving the one magnetic head from the magnetic disk to a vicinity of its periphery during the test of the other magnetic head, the exchange must be performed carefully and so a noise problem occurs in the electrical measurement of the magnetic head under the test.

JP-A-2006-179107 discloses a method in which, in order to improve through-put, two spindles are used alternately. However, the use of one of two magnetic heads is not always completed during a test of the other magnetic head and crosstalk noise may occur in the simultaneous tests of the magnetic heads.

Further, when a tested magnetic head assembly on the spindle is completed is exchanged by a magnetic head assembly to be tested manually, the improvement of the through-put of the testing is limited.

It may be necessary to automate the exchange operation of magnetic head assemblies. In order to load a magnetic head assembly by deriving the magnetic head assembly from a tray (or pallet) and automatically position it on a head clamp table of a head carriage and, after a test is ended, unload it automatically by using a handling robot, high positioning accuracy of the handling robot is required.

Further, since the head clamp table and a clamp mechanism of magnetic head assembly on the head clamp table are provided on a movable table of the head carriage, moving mass and speed in head access and head loading/unloading speeds of them become important. Therefore, it is very difficult practically to freely design and change them. As a result, it is preferable to realize the automation of the exchange operation of magnetic head assembly by performing transfer of magnetic head assembly between the handling robot and the head clamp table and clamping operation on the basis of the clamp operation based on a spring or a mechanism therefore.

SUMMARY OF THE INVENTION

An object of this invention is to provide a test method or a magnetic head tester with which the exchange operation for unloading a tested magnetic head assembly from a head clamp table and loading a new magnetic head assembly to be tested on the head clamp table can be automated and through-put of the magnetic head test processing can be improved.

In order to achieve this object, the magnetic head test method or the magnetic head tester for testing a magnetic head of a magnetic head assembly by clamping said magnetic head assembly having a mounting base on which a mounting hole having a protruded peripheral edge is provided, on a head clamp table and reading data from a rotating magnetic disk by the magnetic head of said magnetic head assembly, is constructed by providing a clamp mechanism having a positioning pin in the clamping table for positioning and clamping the magnetic head assembly on the head clamp table in a predetermined one axis direction through the mounting base with respect to the magnetic head assembly mounted on the head clamp table by fitting the mounting hole in the positioning pin, storing non-tested magnetic head assemblies by fitting the mounting hole of the non-tested magnetic head assemblies in a plurality of boss pins or a plurality of receiving holes of a tray, transporting the non-tested magnetic head assembly from said try to a mounting table having a pin or a hole by positioning a suction portion of a handling robot in a position of the boss pin or the receiving hole and sucking up the non-tested head assembly from the tray, mounting the non-tested magnetic head assembly on the mounting table by positioning the suction portion with using the position of the pin or the hole of the mounting table as a reference and fitting the mounting hole of the magnetic head assembly on the pin or the hole and releasing a sucking operation of the suction portion, positioning the magnetic head assembly by rotating the mounting base with using the pin or the hole as a rotation reference such that the magnetic head assembly is positioned along the predetermined one axis direction, transporting the magnetic head assembly positioned along the predetermined one axis direction, from said mounting table to the head clamp table by sucking the magnetic head assembly by the suction portion of the handling robot, and testing the magnetic head by positioning the suction portion with using the position of the positioning pin as a reference, fitting the mounting hole of the magnetic head assembly in the positioning pin, mounting the non-tested magnetic head assembly on the head clamp table, releasing the sucking operation of the suction portion and clamping the non-tested magnetic head assembly on the head clamp table in the predetermined one axis direction.

In this invention, the magnetic head assembly can be easily mounted on the clamp table by positioning the magnetic head assembly by fitting the mounting hole thereof in the boss pin or the receiving hole in the tray, the pin or the hole in the mounting table and the positioning pin in the head clamp table, respectively, positioning the suction portion on the mounting hole of the mounting base in the boss pin or the receiving hole in the tray, the pin or the hole in the mounting table and the positioning pin in the head clamp table, respectively, sucking the mounting base of the magnetic head assembly and transferring the magnetic head assembly from the tray to the clamp table by the handling robot without requiring high positioning accuracy. By temporarily positioning the magnetic head assembly on the clamp table which is provided in the transporting way such that the magnetic head assembly is put in the mounting direction of the clamp table, the magnetic head assembly can be reliably mounted on the clamp table by the handling robot such that the magnetic head assembly can be clamped selectively.

That is, in this invention, a plurality of magnetic head assemblies are arranged and stored in the tray by fitting the mounting holes having the protruded peripheral edge and provided in the mounting base of the magnetic head assembly in a plurality of the boss pins or the receiving holes. A non-tested magnetic head assembly is picked up by the suction portion of the handling robot from the tray with using a position (coordinates) of the boss pin or the receiving hole corresponding to the non-tested magnetic head assembly as a reference and transported to the mounting table and positioned therein by the handling robot by positioning the suction portion in the pins or holes of the mounting table with using the position (coordinates) thereof. Therefore, the attitude of the magnetic head assembly is ordered by temporally positioning it in the predetermined one axis direction such that the clamp table can clamp the magnetic head assembly.

Next, the magnetic head assembly is transported by the handling robot from the mounting table to the clamp table, the sucking portion is positioned on the clamp table with using the position (coordinates) of the positioning pin as the reference to mount the magnetic head assembly on the clamp table and then to position and clamp the magnetic head assembly by the clamp mechanism.

Therefore, it is possible to automatically set the magnetic head assembly without considerable design change of the clamp mechanism of the clamp table and the clamping operation. Further, it can easily derive the magnetic head assembly from the clamp table automatically by positioning the sucking portion in the clamp table and sucking the magnetic head assembly on the clamp table whose clamping is released.

As a result, it is possible to automate the exchanging operation including the unloading of the tested magnetic head assembly and the setting of a new non-tested magnetic head assembly on the clamp table, so that through-put of the magnetic head test processing can be improved.

In particular, as the test stage of this invention, it is possible to provide a first and second test decks each having a spindle on which a magnetic disk is mounted and a head carriage, a switching circuit and a measuring portion. And, a non-tested magnetic head assembly is mounted and clamped alternately on the clamp tables of the head carriage of the first and second test decks and is tested by alternately connecting the measuring portion to the magnetic head through the switching circuit. In this case, during a test of a magnetic head in one of the test decks, the handling robot can automatically mount a non-tested magnetic head assembly on the clamp table of the head carriage of the other test deck the test in which is ended during the test of the other test deck or the unloading processing of the clamped magnetic head assembly from the clamp table can be done automatically.

Since, therefore, the test processing in the first and second test decks can be executed alternately, a continuous test of magnetic head becomes possible and the efficiency of the magnetic head test can be improved.

BRIEF DESCRIPTION OF THE DRAWINGS

FIG. 3(a) shows a tray for storing magnetic head assemblies and FIG. 3(b) shows a cross sectional view taken along a line B-B in FIG. 3(a);

DESCRIPTION OF THE PREFERRED EMBODIMENT

Figure 1:
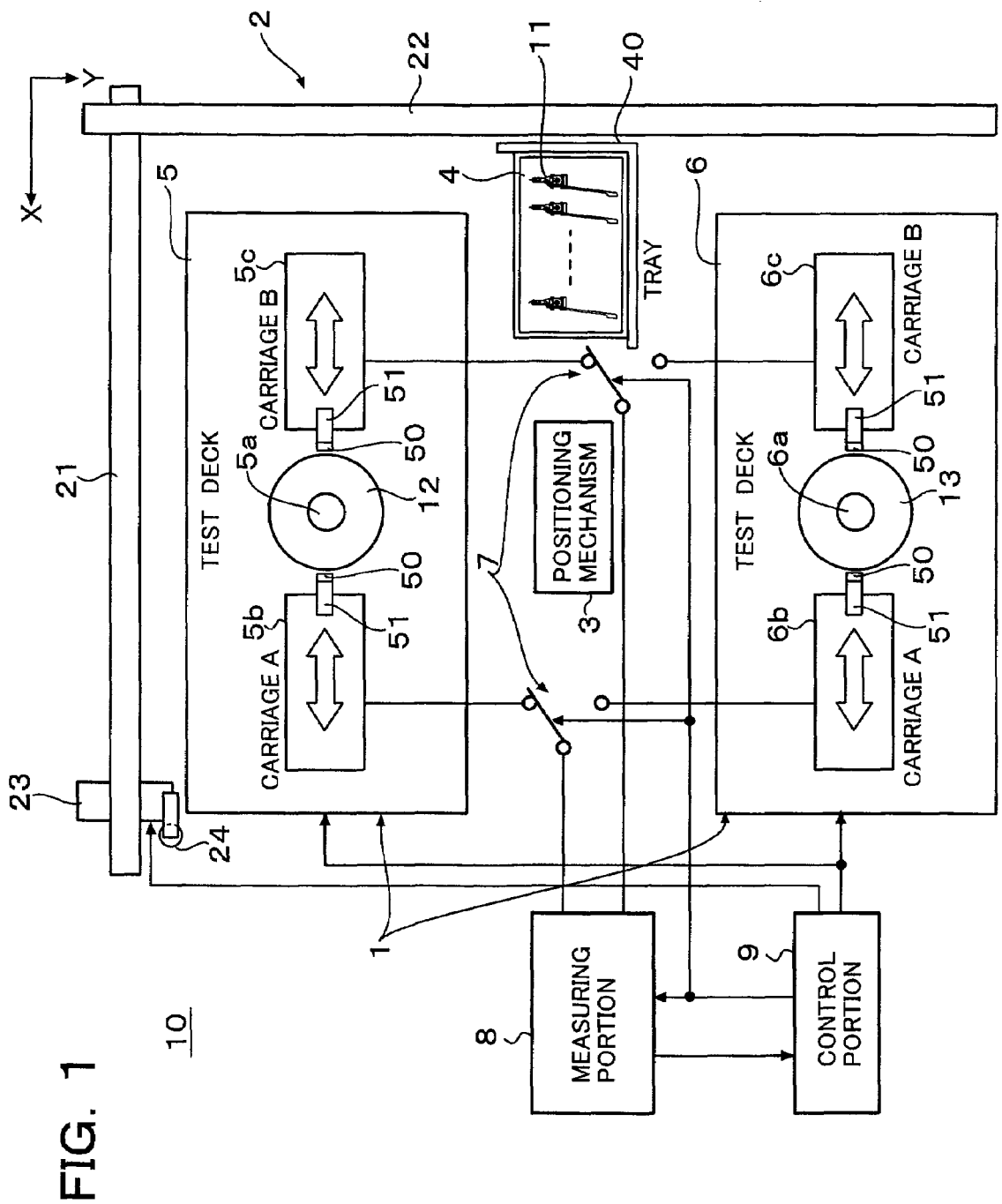
FIG. 1 shows a system construction of a magnetic head tester according to an embodiment of the present invention.

In FIG. 1, a reference numeral 10 depicts a magnetic head tester which includes a plurality of test stages 1, a handling robot 2, a positioning mechanism 3 and a tray 4 for arranging and storing magnetic head assemblies.

Each of the test stages 1 includes a test deck 5 (6), switching circuits 7 and a measuring portion 8 connected to the test decks through the switching circuit 7. A control portion 9 for controlling the test decks and the handling robot 2, etc., is provided. The test deck 5 includes a spindle 5a and a head carriage 5b (carriage A) and a head carriage 5c (carriage B) and the test deck 6 includes a spindle 6a and a head carriage 6b (carriage A) and a head carriage 6c (carriage B). Magnetic disks 12 and 13 are mounted on the spindles 5a and 6a and rotated, respectively.

Figure 5A:
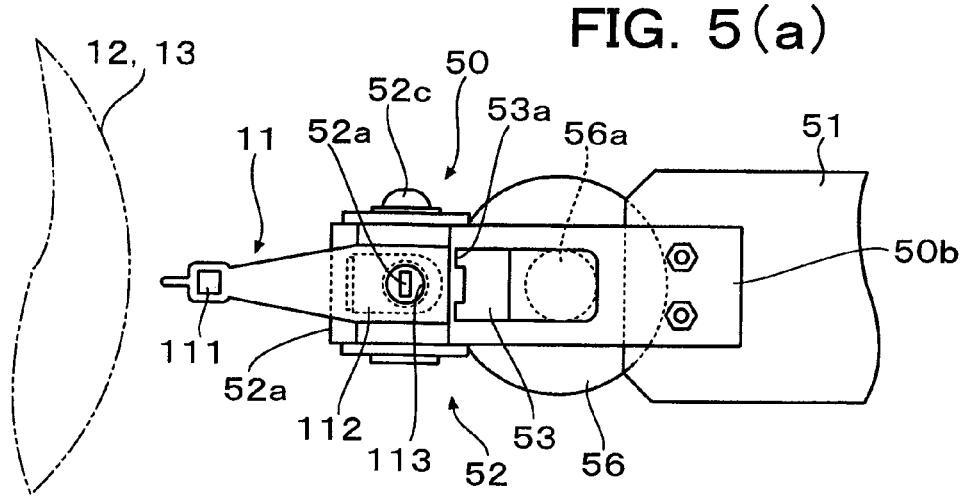
FIG. 5(a) shows a plan view of a clamp table.

Head arms or carriage arms 51 for supporting magnetic head assemblies are provided in the head carriages 5b (5c) and 6b (6c), respectively, and clamp tables 50 (refer to FIG. 5(a)) are fixedly provided on a top end sides of the head arms 51, respectively. The head arms 51 are movable along an X axis direction and, in response to the movement of the head arms, a magnetic head 111 (refer to FIG. 2(a)) accesses a track of a magnetic disk. Magnetic head assemblies 11 (refer to FIGS. 2(a) and 2(b)) are clamped on the clamp tables 50, respectively.

The control portion 9 is constructed with an MPU (processor), a memory, various programs stored in the memory and an external memory device (HDD), etc., to control the handling robot 2, the positioning mechanism 3, the test decks 5 and 6, the switching circuit 7 and the measuring portion 8.

Figure 2A:
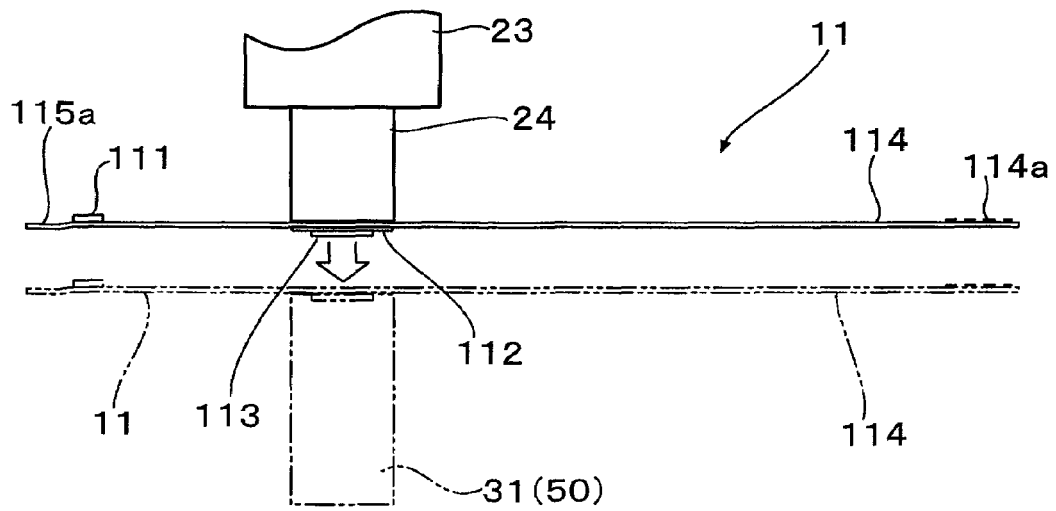
FIG. 2(a) shows a magnetic head assembly and a handling robot for handling the magnetic head assembly.

The control portion 9 controls a switching operation of the switch circuiting 7 such that the measuring portion 8 is connected alternately to magnetic heads 111 (refer to FIG. 2(a)) of respective magnetic head assemblies 11 clamped on the clamp table 50 (refer to FIG. 5(a)) of the test decks 5, 6 to test the magnetic head assemblies 11 (magnetic head 111) mounted on the test decks 5, 6 alternately.

The handling robot 2 functions to demount or unload the magnetic head assembly 11 which is mounted on the clamp table 50 of a test deck which is not tested under control of the control portion 9, that is, test deck which is tested and is not connected to the measuring portion 8, and returned to an original position of the tray 4 (or another pallet), then picks up a non-tested magnetic head assembly 11 from the tray 4 and sets it on the clamp table 50 on the other test deck. Incidentally, the unloading operation of magnetic head assembly from the clamp table 50 is performed in the test decks 5, 6, alternately, so that the setting of a non-tested magnetic head assembly in the clamp table 50 is performed with respect to the test decks alternately, correspondingly thereto.

The handling robot 2 includes an X moving mechanism 21, a Y moving mechanism 22 and a Z moving mechanism 23. The Z moving mechanism 23 is mounted on the X moving mechanism 21. A cylindrical suction collet (suction portion) 24 shown in FIG. 2(a) is provided in a lower side of the Z moving mechanism 23 as a suction head. The cylindrical collet 24 sucks the magnetic head assembly 11 and the handling robot 2 transports the magnetic head assembly 11 sucked by the cylindrical collet 24.

Figure 2B:
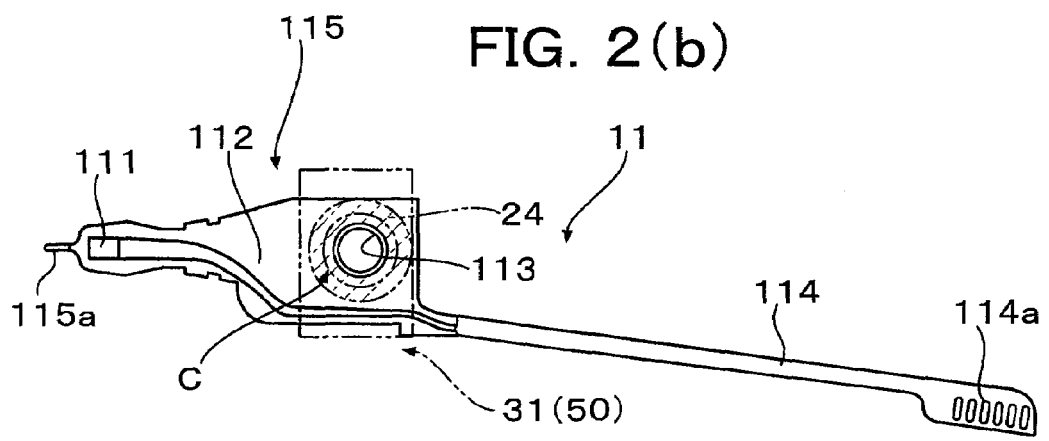
FIG. 2(b) is a plan view of a magnetic head assembly in FIG. 2(a) and FIG. 2(c) is a front view of a flat suction surface of a cylindrical collet.
Figure 2C:
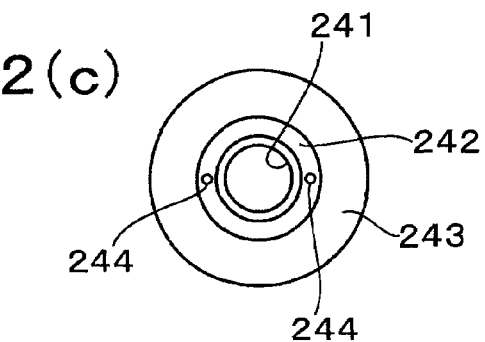

As shown by a plan view in FIG. 2(b), the cylindrical collet 24 sucks and holds a periphery C of a mounting hole 113, which has a protruded peripheral edge, in a mounting base 112 of the magnetic head assembly 11. As shown in a front view in FIG. 2(c), a center portion 241 of a flat suction surface of the cylindrical collet 24 is hollow and a circular thin groove 242 is provided around a thick portion 243 thereof. In this groove 242, two suction holes 244 connected to a negative pressure pump are formed to evacuate the mounting base 112 of the magnetic head assembly 11.

The center hollow portion 241 forms a release hole of a boss pin 41 (refer to a side cross section in FIG. 3(b)) of the tray 4 and a positioning pin 52a (refer to FIG. 5(a)) of the clamp table 50. An inner diameter of the thick portion 43 is slightly larger than an outer diameter of the mounting hole 113 formed in the mounting base portion 112 of the magnetic head assembly 11 shown in FIG. 2(b) such that the periphery of the mounting hole 113 can be sucked in the thin groove 242.

As shown in FIG. 2(a), the protruded peripheral edge of the mounting hole 113 protrudes downward and, as shown in FIG. 2(b), the magnetic head assembly 11 having a downward suspension spring 115 is sucked by the cylindrical collet 24 upward. As shown in FIG. 2(a), the magnetic head assembly 11 is mounted on a mounting table 31 (to be described later) shown by 2-point chain line or the clamp table 50 (to be described later) such that the collet 24 opposes to a rear surface of the magnetic head disk 11, 12.

The protruded peripheral edge of the mounting hole 113 protrudes on a side opposite to the side to be sucked by the collet 24, which may be formed by punching a hole in a surface of the mounting base 112 and caulking or rounding the protruded peripheral edge.

As shown in FIG. 2(b), a flexible printed wiring board 114 having a terminal pad 114a is provided in the magnetic head assembly 11. The printed wiring board 114 has a wiring extending along the suspension spring 115 of the magnetic head assembly 11 and connected to the magnetic head 111 through a mounting base portion 112.

Incidentally, a protrusion 115a provided on a suspension spring 115 forms an engaging portion for ramp-loading the magnetic head 111 on the magnetic disk.

The tray 4 shown in FIG. 1 is positioned in a specific position by the positioning frame 40 and set in the test stage 1. As shown in FIG. 3(a) and FIG. 3(b) which shows a cross section taken along a line B-B in FIG. 3(a), the tray 4 takes in a form of a rectangular dish having a low peripheral edge portion. In the bottom surface of the tray 4, a plurality of boss pins 41 are arranged with predetermined intervals. In the shown example, 20 boss pins 41 are arranged in two lines each including 10 boss pins 41, though only one line of the magnetic head assemblies 11 is shown in FIG. 1. Further, in the plan view shown in FIG. 3(a), there are two positions in which the magnetic head assemblies 11 are not provided for the sake of simplicity of explanation and, in FIG. 3(b), the magnetic head assemblies are not shown. The boss pins 41 shown in FIG. 3(b) are inserted into the mounting holes 113 formed in the mounting base portion 112 of the magnetic head assembly 11 and the magnetic head assemblies 11 are held in the positions of the respective boss pins 41. Pedestals 42 on which rear positions of the mounting base table 112 are formed adjacent to the boss pins 41. The pedestal 42 has a protruded portion corresponding to a position behind the mounting base portion 112. As shown in FIG. 3(a), the magnetic head assemblies 11 are stored in the tray 4 such that the flexible printed wiring boards 114 extend along the side surfaces of the pedestals 42.

Since, when the flexile printed wiring board 114 is rotated counterclockwise, it is engaged with the pedestal 42, the magnetic head assembly 11 is held in a substantially regular position and stored therein. However, there may be a case where the magnetic head assembly 11 is stored by the boss pin 41 in a clockwise rotated state such as shown by third position in the upper line or where the magnetic head assemblies stored by the boss pin 41 in a regular position without correct clamping attitude with respect to the clamp table 50. In order to avoid such case, it is necessary to correct the attitude of the magnetic head assembly 11 by the positioning mechanism 3.

On the other hand, in the magnetic head test device 10, the tray 4 is set in a specified position of the test stage 1 by the positioning frame 40. Therefore, the XY positions (coordinates) of the respective boss pins 41 are fixed to the specified positions. The coordinates of the XY positions are stored in a memory of the control portion 9. Under the control of the control portion 9, the handling robot 2 drives the X moving mechanism 21 and the Y moving mechanism 22 on the basis of the XY coordinates of the boss pins 41 arranged in 2 lines and 10 columns with predetermined intervals, to move the cylindrical collet 24 in X and Y directions with using the coordinates as the reference to thereby positions the collet 24 in a coordinates at which the magnetic head assembly 11 which is not tested yet is sucked and, then, to move the cylindrical collet 24 in the Z direction by a predetermined vertical distance to thereby suck the aimed magnetic head assembly 11 such that it can be picked up from the tray 4.

The non-tested magnetic head assembly 11 sucked up from the tray is transferred to a mounting table 31 (refer to FIG. 4(*a*)) of the positioning mechanism 3 shown in FIG. 1. The handling robot 2 positions the cylindrical collet 24 in a position corresponding to the installation hole 32 (refer to FIG. 4(*a*)) provided in the mounting table 31 and lowers it by a predetermined distance in the Z direction to mount the magnetic head assembly 11 on the mounting table 31 and the suction is released. Incidentally, the XY coordinates of the installation hole 32 is fixed and stored in the memory of the control portion 9.

FIG. 4 shows the positioning mechanism 3 for correcting the attitude of the magnetic head assembly 11 in the mounting direction of the magnetic head assembly 11 on the clamp table.

The positioning mechanism 3 is fixed on a base 10*a* (refer to FIGS. 4(*a*) and 4(*b*)) of the magnetic head tester 10. The mounting table 31 (the installation hole 32 provided in the seat 31*a* thereof) of the positioning mechanism 3 shown in FIG. 4(*a*) is positioned in a fixed position in the magnetic head tester 10.

The installation hole 32 is provided in the seat 31*a* of the mounting base 112 of the magnetic head assembly 11 is fitted in the installation hole 32 and the mounting base 112 is installed in the seat 31*a* by the handling robot 2. In this case, since the coordinates of the boss pin 41 of the magnetic head assembly 11 of the tray 4 and the installation hole 32 provided in the seat 31*a* of the mounting table 31 are fixed, the installation of the magnetic head assembly 11 onto the mounting table 31 is performed by positioning the cylindrical collet 24 in the XY coordinates of the installation hole 31 of the seat 31*a* and then lowering the cylindrical collet 24 downward in the Z direction. Therefore, the mounting hole 113 and the installation hole 32 are fitted together automatically by the handling robot 2 and the mounting mentioned above can be done automatically by the handling robot, reliably.

The seat 31*a* stands up from the bottom of the top portion of the mounting table 31 on the side of the magnetic head 111 of the magnetic head assembly 11. The bottom of the mounting table 31 is fixed on the base 10*a* of the magnetic head tester 10. The installation hole 32 of the seat 31*a* is a snap retaining hole including two holes having predetermined depths and connected each other and, as shown in FIG. 4(*b*), one of the two holes is formed in the top portion and has a smaller diameter corresponding to the outer diameter of the mounting hole 113. The outer diameter of the other hole of the snap retaining hole is slightly larger than the outer diameter of the one hole. A rear portion of the larger holes is cut out in which a pusher block 33 is provided. The pusher block 33 opposes to the installation hole 32 and pushes the mounting base 112 of the magnetic head assembly 11 mounted on the seat 31*a* such that the mounting hole 113 is pushed into the smaller hole of the installation hole 32.

The pusher block 33 is composed of an abutment head 331, an L-shaped frame 332 and a bracket arm 333 and removable in the X axis. The abutment head 331 is a top portion which opposes the installation 32 in a body portion of the L-shaped frame 332 and a rectangular recess 331*a* is formed in the top portion. The bracket arm 333 is a plate member united with and extending horizontally along the bottom of the L shaped frame 332.

A slide bearing 334 is fixed to a lower surface of the L-shaped frame 332 by bolts 334*a* and slides on a guide rail 335 fixed on the bottom surface of the mounting table 31 in the X direction. Therefore, the L-shaped frame 332 is moved horizontally.

A rod 337*a* of an air cylinder 337 passes through an L-shaped leg of the L-shaped frame 332 slidably with respect to a head portion of the rod 337*a* and a nut 337*b* is screwed and fixed on the head portion of the rod 337*a*. A rear end portion 31*b* of the mounting table 31 stands up from the bottom surface thereof correspondingly to the seat 31*a* and forms a peripheral edge. A coil spring 338 is mounted between the rear end portion 31*b* and the L-shaped leg portion 332*a* of the L-shaped frame 332 such that the coil spring 338 in compressed state becomes parallel to the rod 337*a*.

On the other hand, a head portion of the bracket arm 333 extends up to a side surface of the seat 31*a* and pins 336*a* and 336*b* which are higher than the side surface of the mounting base 112 of the magnetic head assembly 22 are implanted in a top end portion thereof. The pins 336*a* and 336*b* are arranged on a line extending in a direction at a predetermined angle α with respect to the side surface of the seat 31*a* and, when the pusher block 33 is moved in the X axis direction, these pins contact with the side surface of the mounting base 112 and are moved forward along the side surface of the seat 31*a*.

When the air cylinder 337 is moved rearward, the rod 337*a* is moved rearward and, when the L-shaped frame 332 is moved rearward against the coil spring 339, the nut 337*b* of the rod 337*a* engages with the leg portion 332*a* to move the L-shaped frame 332 rearward. Therefore, the pusher block 33 is moved rearward and the head portion 331 is moved from the installation hole 32 so that the pins 336*a* and 336*b* are moved rearward up to the rear end portion of the seat 31*a* as shown in FIG. 4(*a*).

In this state, the mounting base 112 of the magnetic head assembly 11 transported by the handling robot 2 fits in the installation hole 32 of the seat 31*a* through the mounting hole 113 and the magnetic head assembly 11 is mounted on the seat 31*a*. And, then, the suction of the cylindrical collet 24 is released.

Figure 4A:
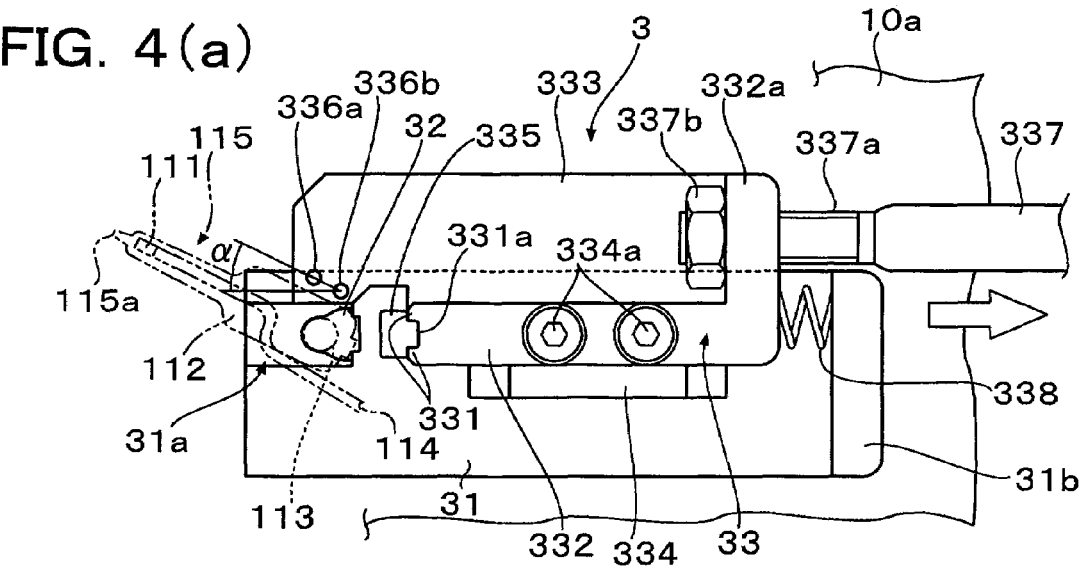
FIG. 4(a) shows a plan view of a positioning mechanism for directing magnetic head assemblies in an arranging direction of the magnetic head assembly on the clamp table.
Figure 4B:
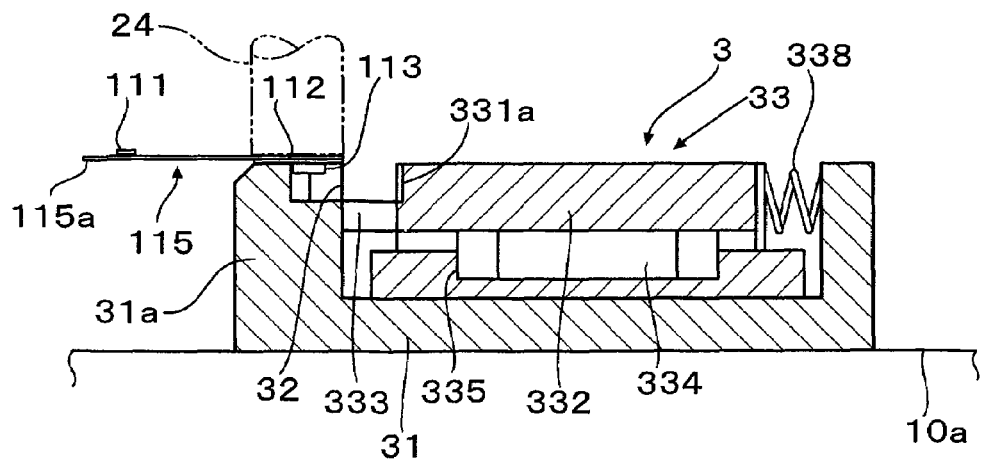
FIG. 4(b) shows a cross sectional view of a positioning mechanism and FIG. 4(c) shows a plan view of a positioning mechanism, in that mechanism the attitude of the magnetic head assembly becomes normal.
Figure 4C:
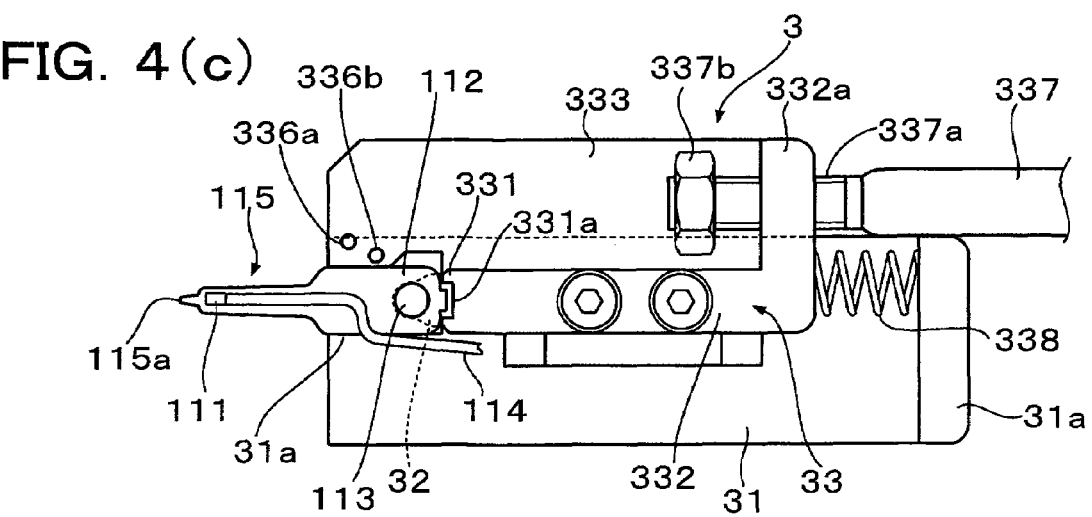

When the pusher block 33 is moved forward with a forward driving of the air cylinder 337 as shown in FIG. 4(*c*), the head portion 331 is moved toward the installation hole 32 by the energized coil spring 339. Simultaneously, the pins 336*a* and 336*b* are moved forward along the side surface of the seat 31*a* and sequentially contact with the side surface of the mounting base 112 of the magnetic head assembly 11. In this case, the mounting base 112 of the magnetic head assembly 11 is rotated counterclockwise by the sequential contact with the pins 336a and 336b. A result of this movement is shown in FIG. 4(c).

As shown in FIG. 4(c), the engagement of the nut 337b of the rod 337a of the pusher block 33 and the L-shaped leg portion 332a is released and the pusher block 33 pushes the rear end portion of the mounting base 112 of the magnetic head assembly 11 by only the resiliency of the coil spring 338.

Incidentally, the movement driven by the air cylinder 337 is performed by the control portion 9.

The magnetic head assemblies 11 mounted on the tray 4 are held by the boss pins 41 and almost stored in normal positions without correct clamping attitude with respect to the clamp table 50. Although the counterclockwise rotation of the magnetic head assembly 11 is stopped by the engagement with the seat 42, there may be a magnetic head assembly 11 rotated clockwise from the normal position. In such case, it is possible that the magnetic head assembly 11 is returned to the normal position by rotating a magnetic head assembly 11 which is not tested yet counterclockwise by the positioning mechanism 3 to make its attitude normal.

Even if there is a magnetic head assembly 11 rotated not clockwise but counterclockwise and is stored in the tray 4, the magnetic head assembly may be mounted on the seat 31a as a magnetic head assembly 11 rotated clockwise from the normal position by rotating the cylindrical collet 24 clockwise by a predetermined angle.

As shown in FIG. 4(c), the mounting base 112 of the magnetic head assembly 11 is rotated counterclockwise such that the attitude of the magnetic head assembly 11 becomes normal by the sequentially contact with the pins 336a and 336b. In such case, the mounting hole 113 of the magnetic head assembly 11 is pushed forward by resiliency of the coil spring 338 with using the suction surface of the cylindrical collet 24 as a guide and the mounting hole 113 of the magnetic head assembly 11 is fitted in the small hole of the snap retaining hole of the installation hole 32 as shown in FIG. 4(b). Therefore, the attitude of the magnetic head assembly 11 becomes normal along the X axis direction by the position of the small hole portion of the snap retaining hole.

Incidentally, the pins 336a and 336b are arranged along the line extending in a direction at angle α with respect to the side surface of the seat 31a and, when the rotation of the magnetic head assembly 11 is large, the pin 336a contacts first with the side surface of the seat 31a to reduce the rotation of the magnetic head assembly 11 and, then, the pin 336b contacts with the magnetic head assembly 11 to further reduce the rotation to correct the position of the magnetic head assembly 11 to make the magnetic head assembly correct clamping attitude with respect to the clamp table 50. Thus, the magnetic head assembly 11 on the seat 31a becomes normal state without rotation by the resiliency of the coil spring 338. The above positioning operation in the XY coordinates is the same as that of the magnetic head assembly 11 in a positioning clamp by a coil spring of the clamp table 50 to be described later.

As a result, in the positioning mechanism 3, the magnetic head assembly 11 is set such that it becomes parallel to the X axis when it is mounted on the clamp table and the positioning along the X axis direction is performed. Further, the mounting hole 113 of the magnetic head assembly 11 is positioned in substantially the reference position in XY directions on the clamp table.

In other words, the magnetic head assembly 11 at this time becomes parallel to the mounting direction of the clamp table and the positioning of the magnetic head assembly 11 in the XY coordinates is substantially completed.

When the positioning is determined by the positioning mechanism 3, the mounting base 112 of the magnetic head assembly 11 is positioned between the seat 31a and the cylindrical collet 24 with the suction being released. The mounting base 112 of the magnetic head assembly 11 is pinched between the seat 31a and the collet 24. Therefore, the cylindrical collet 24 functions to guide the mounting base 112 of the magnetic head assembly 11.

After this positioning is made by the cylindrical collet 24, the handling robot 2 sucks the mounting base 112 of the magnetic head assembly 11 mounted on the seat 31a and drives the air cylinder 337 rearward to move the rod 337a rearward against the coil spring 339 to thereby move the pusher block 33 rearward. FIG. 4(a) shows this state. At this time, the cylindrical collet 24 is moved upward in the Z direction, picks up a magnetic head assembly 11 which is not tested yet from the seat 31a and transports the magnetic head assembly 11 to the clamp table 50 on the side of one of the test decks 5 and 6 in which the test is ended. This processing will be described later.

Then, the handling robot 2 positions the cylindrical collet 24 in the XY coordinates on the basis of the XY coordinates of the positioning pin 52a of the clamp table 50. Then, the handling robot 2 lowers the cylindrical collet 24 by a predetermined distance to mount the magnetic head assembly 11 to be tested on the clamp table 50 and releases the suction of the cylindrical collet 24. In this case, the mounting base 112 of the magnetic head assembly 11 is pinched between the cylindrical collet 24 and the seat 50a (refer to FIGS. 5(a) and 5(b)). In this state, the cylindrical collet 24 functions to guide the mounting base 112 of the magnetic head assembly 11 and to clamp the assembly on the clamp table 50. Thus, the positioning preciseness is improved.

FIG. 5 shows a head clamp mechanism on each of the clamp tables 50 of the test decks 5 and 6.

Each clamp table 50 is fixed to a top end portion of a head arm 51 of one of the head carriages 5b (5c), 6b (6c). As shown by the plan view in FIG. 5(a), a swinging positioning mechanism 52 for swinging the positioning pin 52a longitudinally is provided on the clamp table 50. Incidentally, the positioning pin 52a has a rectangular cross section as shown.

The handling robot 2 which have sucked the magnetic head assembly 11 positioned along the X axis direction on the mounting table 31 of the positioning mechanism 3 can mount the magnetic head assembly 11 on the clamp table 50 by positing the cylindrical collet 24 on the basis of the XY position coordinates of the positioning pin 52a of the swinging positioning mechanism 52 and, then, lowering it by a predetermined distance in the Z direction to thereby fit the positioning pin 52a in the mounting hole 113 of the mounting base 112.

An abutment block 53 having a contact head portion 53a is provided in a rear portion of the clamp table 50. The abutment block 53 is mounted on a bracket portion 50b (refer to FIG. 5(b)) extending horizontally from a rear portion of the seat 50a of the clamp table 50 and is fixed thereto by a bolt screw, etc. The abutment block 53 stands up from the bracket portion 50b and protruded horizontally from the bracket portion 50b to a top position such that the contact head portion 53a corresponds to the rear end surface of the mounting base 112 of the magnetic head assembly 11 mounted on the clamp table 50.

The bracket portion 50b is supported by bolting to the head arm 51 and the respective clamp tables 50 are supported on the head carriages 5b, 5c, 6b and 5c by the bracket 50b.

The positioning pin 52a is fitted in the mounting hole 113 of the mounting base 112 of the magnetic head assembly 11 to mount the latter on the seat 50a. A recessed portion 50c (refer to FIG. 5(b)) for receiving the mounting base 112 is provided in the seat 50a.

The positioning pin 52a provided in the head portion of the swinging positioning mechanism 52 protrudes from the seat 50a and swings clockwise in a vertical plane. By this swinging, the mounting base 112 of the magnetic head assembly 11 is moved rearward such that the rear surface of the mounting base 112 contacts with the contact head portion 53a. As a result, the magnetic head assembly 11 is positioned and clamped by the mounting base 112 pinched between the slanted positioning pin 52a and the contact head portion 53a, as shown in FIG. 5(c).

The contact head portion 53a has a rectangular recess 53b at a center portion thereof and the mounting base 112 of the magnetic head assembly 11 is pressed by two protruded portions on both sides of the recessed portion. The positioning pin 52a having the rectangular cross section is engaged with the protruded hole 113 at two points, so that the mounting base 112 is pressed at four points. Therefore, the magnetic head assembly 11 is positioned with high precision.

Figure 5B:
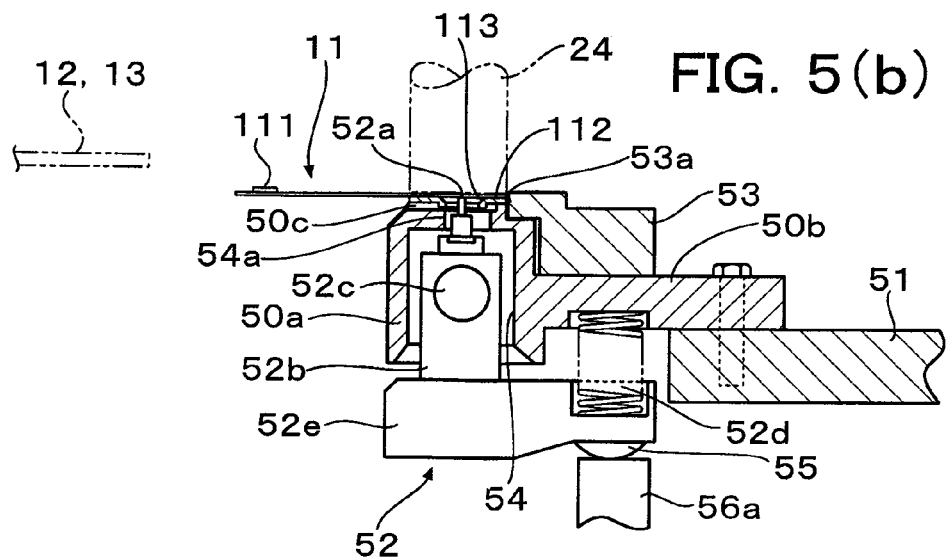
FIG. 5(b) shows a cross sectional view of a clamp table and FIG. 5(c) shows in that table the positioning pin swings in a rear side of a vertical plane thereof.
Figure 5C:
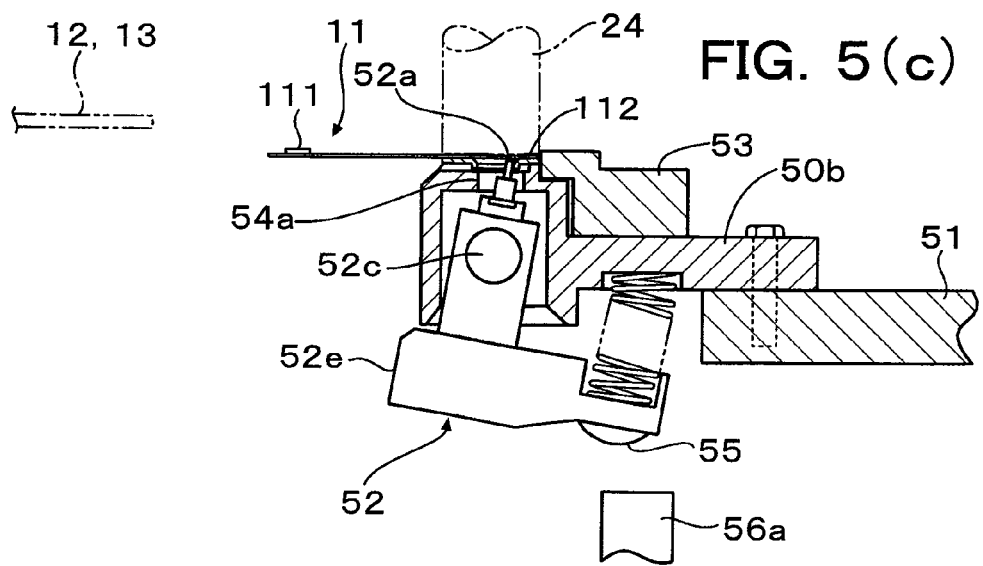

As shown in a cross sectional view shown in FIG. 5(b), the seat 50a has a through-hole 54 and the swinging positioning mechanism 52 is constructed with the positioning pin 52a, a swing lever 52b provided within the through-hole 54, a shaft pin 52c and a coil spring 52d.

The positioning pin 52a is implanted in a head portion of the swing lever 52b. The reversed-T shaped swing lever 52b is provided vertically in the through-hole 54 of the seat 50a and a top end portion of the positioning pin 52a protrudes upward from the hole 54a of the through-hole 54. The swing lever 52b is supported within the through-hole 54 by the shaft pin 52c, which is supported by the seat 50a, such that it swings forward and backward within the through-hole 54.

A lower end portion 52e of the reversed-T shaped swing lever 52b extends horizontally and the energized coil spring 52d is provided between a lower surface of the bracket portion 50b and a rear side of the lower end portion 52e. The coil spring 52d is energized such that the positioning pin 52a swings in a rear side of a vertical plane thereof (refer to FIG. 5(c)).

A semispherical protrusion 55 is provided in a rear surface side of the lower end portion 52e of the swing lever 52b correspondingly to the position of the coil spring 52d. The coil spring 52d is maintained in a compressed state by a contact of a forward moved rod 56a of an air cylinder 56 (refer to FIG. 1) with the protrusion 55. In this state, the positioning pin 52a is maintained vertically and positioned in the normal coordinates as shown in FIG. 5(b). In this state, the air cylinder 56 is driven forward.

In this state, the positioning pin 52a is fitted in the mounting hole 113 of the mounting base 112 of the magnetic head assembly 11 transported by the handling robot 2 by the downward movement of the cylindrical collet 24. When the mounting base 112 is put in the recessed portion 50c (refer to FIG. 5(b) of the seat 50a, the suction of the cylindrical collet 24 is released. When the air cylinder 56 is driven rearward, the positioning pin 52a swings clockwise from the state shown in FIG. 5(b) by the coil spring 52d as a guide to the state shown in FIG. 5(c) with using the suction surface of the cylindrical collet 24 as a guide. In this state, the swing positioning mechanism 52 positions and clamps the magnetic head assembly 11. The clamping in this case is due to the resiliency of the coil spring 52d similarly to the conventional clamp mechanism.

As a result, the clamping and the releasing of the magnetic head assembly 11 mounted on the clamp table 50 thereto by the coil spring 52d become possible by the movement of the air cylinder 56 forward and backward.

Incidentally, the clamping and releasing by the air cylinder 56 are performed by driving and releasing or forward and rearward driving of the air cylinder 56 under control of the control portion 9. Since the magnetic head 111 is clamped on the clamp table 50, the magnetic head 111 is loaded on the lower surface of the magnetic disk 12, 13 by the head carriage 5b, 5c, 6b, 6c.

On the other hand, when the magnetic head 111 is to be loaded on an upper surface of the magnetic disk 12, 13, it can be done by rotating the head arm 51 or the clamp table 50 by 180° in vertical direction after the magnetic head assembly 11 is clamped on the upper surface of the clamp table 50.

Now, the process of the magnetic head test will be described.

Figure 6:
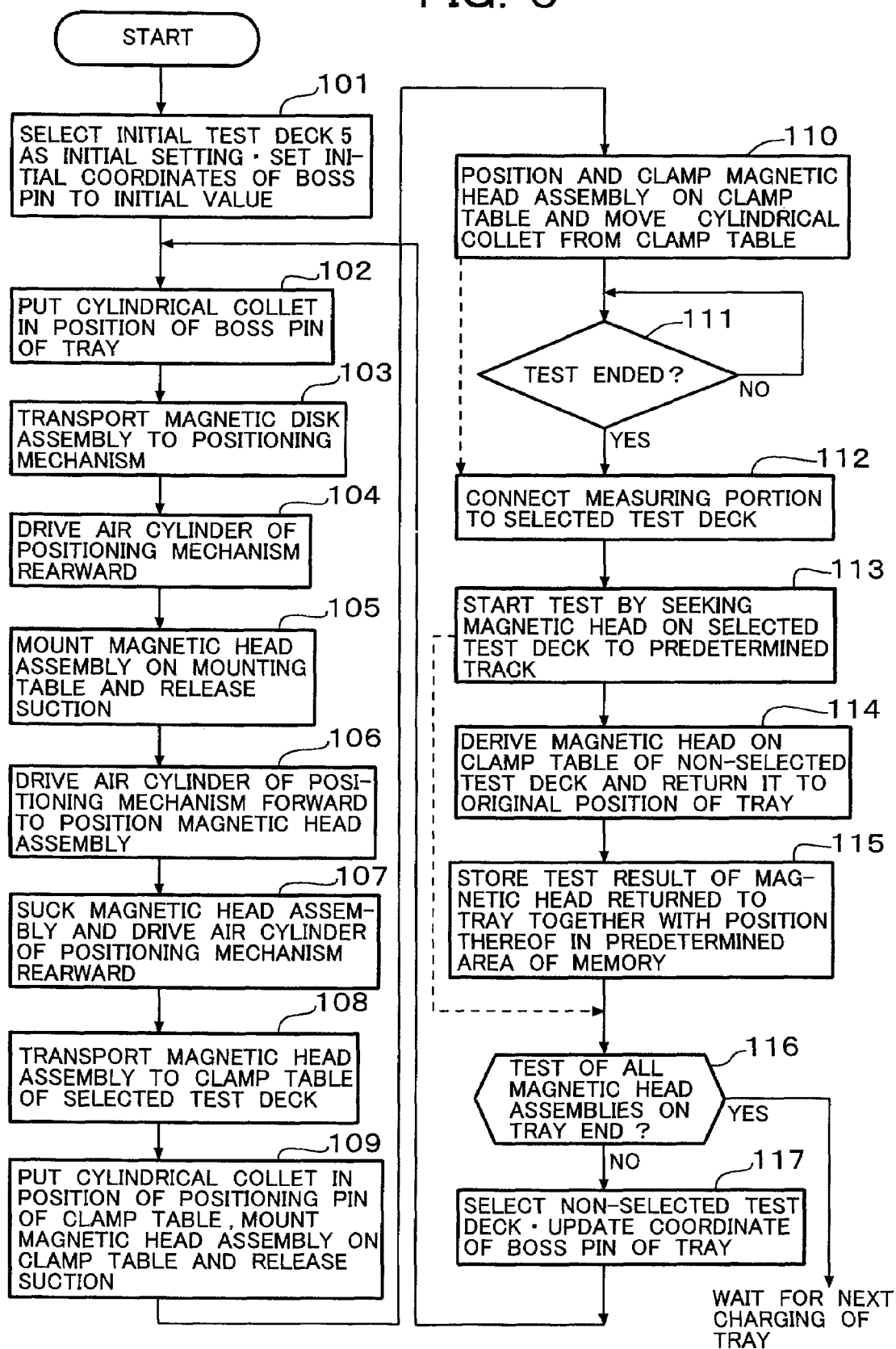
FIG. 6 is a flowchart of the processing of the magnetic head test method according to an embodiment of this invention.

FIG. 6 shows a flowchart of the process of the magnetic head test according to an embodiment of this invention.

Incidentally, a simple case in which the spindle 5a and one head carriage 5b and a spindle 6a and one head carriage 6b are provided without the head carriages 5c and 6c shown in FIG. 1 will be described. The case where two head carriages are provided will be described later complimentarily.

The magnetic head testing to be described bellow is performed under control of the control portion 9 by executing a magnetic head test program stored in a memory of the control portion 9 by a MPU.

According to an input of a predetermined test start key from a keyboard, the control portion 9 selects the test deck 5 and set the coordinates of the boss pin 41 of the tray 4 in an initial position in which a magnetic head assembly is to be picked up (Step 101). Then, the control portion 9 positions the cylindrical collet 24 in the coordinates of a certain boss pin 41 (an initial position) in the tray 4 by controlling the handling robot 2 (Step 102), picks up a magnetic head assembly 11 which is not tested yet by the cylindrical collet 24 and transports the magnetic assembly 11 to the positioning mechanism 3 (Step 103).

The control portion 9 drives the air cylinder 337 of the positioning mechanism 3 rearward (Step 104), positions the cylindrical collet 24 in the coordinates of the insertion hole 32 of the seat 31a to mount the magnetic head assembly 11 on the seat 31a of the positioning mechanism 3 and releases the suction of the cylindrical collet 24 (Step 105).

Next, the control portion 9 drives the air cylinder 337 forward to position the magnetic head assembly 11 (Step 106). Then, the control portion 9 sucks the magnetic head assembly 11 positioned by the cylindrical collet 24 and drives the air cylinder 337 of the positioning mechanism 3 backward (Step 107).

Then, the control portion 9 picks up the magnetic head assembly 11 which is not tested yet from the seat 31a by the cylindrical collet 24 and transports the assembly to the clamp table 50 of the selected test deck (Step 108). Then, the control portion 9 positions the cylindrical collet 24 in the coordinates of the positioning pin 52a of the clamp table 50, mounts the magnetic head assembly 11 which is not tested yet on the clamp table 50 and releases the suction (Step 109).

Since the test deck 5 is selected initially in the Step 101, the magnetic head assembly 11 which is not tested yet is set in the clamp table 50 of the test deck 5 in the Step 109. Since the test deck 6 is selected in the Step 117 to be described later, the magnetic head assembly 11 which is not tested yet is set in the clamp table 50 of the test deck 6 in the Step 109. The non-tested magnetic head assembly 11 is alternately set on the clamp table 50 of the test decks by the selective switching of the test decks in the Step 117.

Next, the control portion 9 releases the driving of the air cylinder 56, drives the swing positioning mechanism 52, clamps the magnetic head assembly which is set in the Step 109 in the clamp table 50 and retracts the cylindrical collet 24 from the clamp table 50 (Step 110).

Next, the control portion 9 waits an end of magnetic head test by the measuring portion 8 (Step 111). When the testing processing is started initially, the processing in the Step 111 is skipped and shifted to a next Step 112 which is started after the test of the magnetic head assembly 11 is ended.

Next, in the Step 112, the control portion 9 switches the switching circuit 7 to the selected test deck (initially, the test deck 5) and connects the measuring portion 8 to the selected test deck (test deck 5) (Step 112). The control portion 9 moves the magnetic head 111 to seek a predetermined track on the magnetic disk (initially, the magnetic disk 12), reads and writes data and starts the test (Step 113). Then, the control portion 9 demounts the magnetic head assembly 11 on the clamp table 50 of the non-selected test deck and returns the assembly to the storing position in the tray 4 (Step 114).

Then, the control portion 9 stores data of the magnetic head returned to the tray 4 in a predetermined region of the memory corresponding to the coordinates of the tray 4 (Step 115).

Incidentally, since the magnetic head on the test deck 6 is not tested in the initial processing, the Steps 114 and 115 are skipped and shifted to Step 116 as shown by a dotted line.

Then, the control portion 9 determines whether or not the test of the non-tested magnetic head assembly 11 is completed (Step 116). This determination is performed by, for example, determining, from the current coordinates of the boss pin, whether or not there is a coordinates of a boss pin of the magnetic head assembly 11 to be picked up next.

When the determination is NO, the control portion 9 selects a test deck (initially, the test deck 6) which is not selected, updates the coordinates of the boss pin 41 of the non-tested magnetic head assembly 11 (Step 117) and returns to the Step 102.

Thereafter, in the Step 108, the control portion 9 transports the magnetic head assembly 11 to the clamp table 50 of the test deck 6, mounts the non-tested magnetic head assembly 11 on the clamp table 50 of the test deck 6 in the Step 109, clamps the assembly on the table in the Step 110 and retracts the cylindrical collet 24 from the clamp table 50.

The control portion 9 waits for an end of the magnetic head test (initially, the end of the test of the test deck 5) of the measuring portion 8 (Step 111) and, when the test is ended, shifts to the Step 112. The switch circuit 7 is switched to the side of the test deck 6 selected in the Step 112 to connect the measuring portion 8 to the test deck 6 and the test of the magnetic head 113 in the test deck 6 is started (Step 113). The control portion 9 demounts the magnetic head assembly 11 on the clamp table 50 of the magnetic head 111 of the test deck (test deck 5) on the side which is not selected in the Step 117 and returns it to the storing position of the tray 4 (Step 114). The control portion 9 stores the test data of the magnetic head assembly 11 which is returned to the initial position of the tray 4 in the Step 115 in a predetermined region of the memory correspondingly to the coordinates of the position and it is determined in the Step 116 whether or not the test of the magnetic head assembly is ended.

When the test of the magnetic head assembly is ended, the processing of the control portion 9 is ended and the control portion 9 becomes standby state until a new tray 4 is mounted on the test stage 1. When the new tray 4 is mounted on the test stage 1, the control portion 9 restarts the test processing from the Step 101.

This test operation is continued until a test end key is pushed.

Incidentally, the Steps 114 and 115 may be reversed.

Now, an embodiment in which the test decks 5 and 6 have carriages 5c and 6c in addition to the carriages 5b and 6b, respectively will be described.

First, it is assumed that the processing of the control portion 9 in the Steps 101 to 108 is ended and the magnetic head is transported to the clamp table of the head carriage 5b or 6b and the processing enters into the Step 110. After the magnetic head is clamped on the clamp table 50 of the head carriage 5b or 6b in the Step 110, the control portion 9 updates the position of the boss pin of the tray 4 and, then, returns to the Step 102. Thereafter, in the Step 108, the control portion 9 transports the magnetic head to the clamp table of the head carriage 5c or 6c of the selected test deck.

In the Step 110, the control portion 9 positions and clamps the magnetic head assemblies 11 on the clamp table 50 of the remaining carriage 5c or 6c. Thus, it is possible to clamp the magnetic head assemblies 11 on the clamp tables 50 of the two head carriages. Thereafter, the previously mentioned processing from the Step 111 is performed.

By the above processing, the positioning mechanism 3 can be utilized as a positioning mechanism common for the respective clamp tables of the test decks 5 and 6. According to this invention, it is possible to test the magnetic heads 111 alternately and continuously by the test decks 5 and 6 by positioning the magnetic heads 111 on the clamp tables 50 alternately.

Incidentally, in the Step 111, the magnetic head assemblies 11 may be stored in trays other than the tray 4 correspondingly to the acceptable test result of the magnetic head.

As described hereinbefore, the suction collet is the cylindrical collet in the described embodiment. However, the collet is not limited to the cylindrical collet and may be a rectangular collet and other suction head may be used.

In the described embodiment, the magnetic head assemblies are stored in the tray by the suction collet with the magnetic heads being upward and are set on the clamp table such that the magnetic heads are upward. However, the magnetic head assemblies may be stored in the tray by the suction collet with the magnetic head being downward and set on the clamp table such that the magnetic heads are downward. Since, in such case, the protruded portion of the mounting hole becomes upward, the seat of the mounting table of the poisoning mechanism 3 is not the inserting hole but a mounting pin such that the cylindrical collet 24 gets away upward or the sucking surface of the collet 24 may be made larger such that the positioning movement is possible.

Although the test decks 5 and 6 are provided in order to improve the efficiency in the described embodiment, it is not necessary to provide a plurality of test decks in order to merely automate the magnetic head test.

Further, the insertion hole 32 of the seat 31a of the positioning mechanism 3 in this embodiment may be a pin and the boss pin 41 of the tray 4 may be a hole receiving the boss pin.

Incidentally, the tray in this specification and the scope of demand for patent includes a pallet or a general vessel.

The invention claimed is:

1. A magnetic head test method for testing a magnetic head of a magnetic head assembly by clamping said magnetic head assembly having a mounting base on which a mounting hole having a protruded peripheral edge is provided, on a head clamp table and reading data from a magnetic disk by said magnetic head of said magnetic head assembly, comprising the steps of:

providing a clamp mechanism for positioning and clamping said magnetic head assembly on said head clamp table in a predetermined one axis direction through said mounting base of said magnetic head assembly with respect to said magnetic head assembly mounted on said head clamp table by fitting said mounting hole in a positioning pin standing up from said head clamp table;

storing a plurality of non-tested said magnetic head assemblies in a tray by fitting said mounting holes of said non-tested magnetic head assemblies in a plurality of boss pins or a plurality of receiving holes of said tray, respectively;

transporting one of said non-tested magnetic head assemblies from said try to a mounting table having a pin or a hole by positioning a suction portion of a handling robot in a position of one of said boss pins or one of said receiving holes and sucking up said one of said non-tested head assemblies from said tray, mounting said one of said non-tested magnetic head assemblies on said mounting table by positioning said suction portion using the position of said pin or said hole of said mounting table as a reference and fitting said mounting hole thereof in said pin or said hole of said mounting table and releasing a sucking operation of said suction portion;

positioning said one of said non-tested magnetic head assemblies by rotating said mounting base thereof with said pin or said hole of said mounting table as a rotation reference such that said one of said non-tested magnetic head assemblies is positioned along said predetermined one axis direction;

transporting said one of said non-tested magnetic head assemblies positioned along said predetermined one axis direction, from said mounting table to said head clamp table by said handling robot by sucking said one of said non-tested magnetic head assemblies by said suction portion; and testing said magnetic head of said one of said non-tested magnetic head assemblies by positioning said suction portion using the position of said positioning pin as a reference, fitting said mounting hole thereof in said positioning pin, mounting said one of said non-tested magnetic head assemblies on said head clamp table, releasing the suction of said suction portion and clamping said one of said non-tested magnetic head assemblies on said head clamp table in said predetermined one axis direction.

2. A magnetic head test method claimed in claim 1, wherein said suction portion is a suction head, the suction head sucks said non-tested magnetic head assembly by sucking a periphery of said mounting hole, said suction head is positioned on said head clamp table with said positioning pin as a reference after the test of said magnetic head is completed and said magnetic head assembly is demounted from said head clamp table by sucking said magnetic head assembly whose clamping is released by said clamp mechanism.

3. A magnetic head test method claimed in claim 2, wherein said suction head is a suction collet having a hollow cylinder and a flat suction surface, a circular suction groove is formed in said flat suction surface, said non-tested magnetic head assembly mounted on said mounting table is rotated in said predetermined one axis direction using said suction collet whose suction is released as a guide.

4. A magnetic head test method claimed in claim 3, wherein said non-tested magnetic head assembly mounted on said head clamp table is clamped on said clamp table by said clamp mechanism along said predetermined one axis direction using said suction collet whose adsorption is released as a guide.

5. A magnetic head test method claimed in claim 4, wherein said pin or said hole of said mounting table positions said non-tested magnetic head assembly in said predetermined one axis and two axis directions orthogonal to said one axis when said non-tested magnetic head assembly is mounted.

6. A magnetic head test method claimed in claim 5, wherein said mounting table has a pusher block movable along said predetermined one axis and said magnetic head assembly is positioned by pushing said mounting base of said magnetic head assembly mounted on said mounting table in said one axis direction to fit said mounting hole on said pin or said hole of said magnetic head assembly.

7. A magnetic head test method claimed in claim 6, wherein said hole having a predetermined depth is formed in a surface side of said mounting table, said hole including a large vertical groove and a small vertical groove which are connected each other.

8. A magnetic head test method claimed in claim 2, wherein a first test deck and a second test deck each having a spindle on which said magnetic disk is mounted and said head clamp table, a switch circuit and a measuring portion, comprising the steps of clamping said non-tested magnetic head assembly on one of said head clamping tables of said first and second test decks as a first magnetic head assembly, testing said magnetic head of said first magnetic head assembly by connecting said magnetic head assembly to said measuring portion through said switching circuit, clamping another non-tested magnetic head assembly on the other head clamp table as a second magnetic head assembly, testing said magnetic head of said second magnetic head assembly by connecting said magnetic head to said measuring portion through said switching circuit when the test of said magnetic head of said first magnetic head assembly is completed, demounting said first magnetic head assembly having said magnetic head whose test is ended from said head clamp table, and transporting said first magnetic head assembly whose test is ended to said tray or another tray.

9. A magnetic head test method claimed in claim 8, comprising the steps of clamping another non-tested magnetic head assembly on said head clamp table from which said first magnetic head assembly is demounted, connecting said magnetic head to said measuring portion through said switching portion when the test of said magnetic head of said second magnetic head assembly is ended, demounting said second magnetic head assembly having said magnetic head whose test is ended from said head clamp table, transporting said second magnetic head assembly to said tray or said another tray, and said magnetic heads on said first and second test decks are tested, alternately.

10. A magnetic head test method claimed in claim 9, wherein said handling robot transports said non-tested magnetic head assembly positioned on said mounting table to said head clamp table of one of said first and second test decks from which said magnetic head assembly is demounted from said head clamp table.

11. A magnetic head test method claimed in claim 2, wherein said clamp mechanism includes a swing positioning mechanism provided on said clamp table, said positioning pin having a rectangular cross section is provided on a head portion of said swinging positioning mechanism, said non-tested magnetic head assembly mounted on said clamp table is clamped by swinging said positioning pin backward with respect to said magnetic head by said swinging positioning mechanism.

12. A magnetic head tester for testing a magnetic head of a magnetic head assembly by clamping said magnetic head assembly having a mounting base on which a mounting hole having a protruded peripheral edge is provided, on a head clamp table and reading data from a magnetic disk by said magnetic head of said magnetic head assembly, comprising a clamp mechanism for positioning and clamping said magnetic head assembly on said head clamp table in a predetermined one axis direction through said mounting base of said magnetic head assembly with respect to said magnetic head assembly mounted on said head clamp table by fitting said mounting hole on a positioning pin standing up from said head clamp table;

a tray for storing a plurality of non-tested magnetic head assemblies by fitting a plurality of boss pins or a plurality of receiving holes in said mounting holes of said non-tested magnetic head assemblies, respectively;

a handling robot having a suction portion for sucking said mounting base of one of said non-tested magnetic head assemblies around said mounting hole thereof;

a positioning mechanism including a mounting table having a pin or a hole with which said mounting hole of said one of said non-tested magnetic head assemblies is fitted, for positioning said one of said non-tested magnetic head assemblies in said predetermined one axis direction by rotating said mounting base thereof mounted on the mounting table by the fitting of said pin or said hole of said mounting table using said mounting hole thereof as rotation reference; and a control portion for controlling said handling robot to position said suction portion with using a position of one of said boss pins or a position of one of said receiving holes as a reference, derive said one of said non-tested magnetic head assemblies from said tray by sucking said one of said non-tested magnetic head assemblies in said tray, transport said one of said non-tested head assemblies from said tray to said mounting table by said handling robot, position said one of said magnetic head assemblies by rotating said mounting base thereof using said pin or said hole of said mounting table as a rotation reference to mount said one of said non-tested magnetic head assemblies on said mounting table, release a suction of said suction portion, suck said one of said non-tested magnetic head assemblies positioned on said mounting table by said suction portion of said handling robot, position said suction portion on said head clamp table by said handling robot using the position of said positioning pin, mount said one of said non-tested magnetic head assemblies on said head clamp table and release the suction of said suction portion.

13. A magnetic head tester claimed in claim 12, wherein said control portion controls said positioning mechanism to position said magnetic head assembly in said predetermined one axis direction and controls said clamp mechanism to clamp said magnetic head assembly on said head clamp table.

14. A magnetic head tester claimed in claim 13, wherein said suction portion is a suction head, the suction head sucks said non-tested magnetic head assembly by sucking a periphery of said mounting hole, said control portion positions said suction head on said head clamp table using said positioning pin as a reference after the test of said magnetic head is completed and demounts said magnetic head assembly from said head clamp table by sucking said magnetic head assembly whose clamping is released by said clamp mechanism.

15. A magnetic head tester claimed in claim 14, wherein said suction head is a suction toilet having a hollow cylinder and a flat suction surface, said non-tested magnetic head assembly mounted on said mounting table is rotated in said predetermined one axis direction using said suction collet whose suction is released as a guide.

16. A magnetic head tester claimed in claim 15, wherein said non-tested magnetic head assembly mounted on said head clamp table is clamped on said clamp table by said clamp mechanism in said predetermined one axis direction using said suction collet whose suction is released as a guide.

17. A magnetic head tester claimed in claim 16, wherein said pin or said hole of said mounting table positions said non-tested magnetic head assembly in said predetermined one axis direction and two axis directions orthogonal to said one axis direction when said non-tested magnetic head assembly is mounted.

18. A magnetic head tester claimed in claim 13, further comprising a first test deck and a second test deck each having a spindle on which said magnetic disk is mounted and said head clamp table, a switching circuit and a measuring portion, wherein said non-tested magnetic head assembly is clamped on one of said head clamping tables of said first and second test decks as a first magnetic head assembly and tested by connecting said magnetic head assembly to said measuring portion through said switching circuit, another non-tested magnetic head assembly is clamped on the other head clamp table as a second magnetic head assembly, said magnetic head of said second magnetic head assembly is tested by connecting said magnetic head to said measuring portion through said switching circuit when the test of said magnetic head of said first magnetic head assembly is completed, said first magnetic head assembly having said magnetic head whose test is ended is demounted from said head clamp table and transported to said tray or another tray.

19. A magnetic head tester claimed in claim 18, wherein another non-tested magnetic head assembly is clamped on said head clamp table, from which said first magnetic head assembly is demounted, as said first magnetic head assembly and said magnetic head is connected to said measuring portion through said switching portion when the test of said magnetic head of said second magnetic head assembly is ended, said second magnetic head assembly having said magnetic head whose test is ended is demounted from said head clamp table and transported to said tray or another tray, and said magnetic heads on said first and second test decks are tested, alternately.

20. A magnetic head tester claimed in claim 19, wherein said handling robot transports said non-tested magnetic head assembly positioned on said mounting table to said head clamp table of one of said first and second test decks from which said magnetic head assembly is demounted from said head clamp table.

21. A magnetic head tester claimed in claim 20, wherein said clamp mechanism includes a swinging positioning mechanism provided on said clamp table, said positioning pin having a rectangular cross section is provided on a head portion of said swinging positioning mechanism, said non-tested magnetic head assembly mounted on said clamp table is clamped by swinging said positioning pin backward with respect to said magnetic head by said swinging positioning mechanism.

* * * * *